United States Patent [19]

van der Lely

[11] 4,452,496

[45] * Jun. 5, 1984

[54] TRACKED VEHICLES

[76] Inventor: Cornelis van der Lely, 7, Brüschenrain, Zug, Switzerland

[*] Notice: The portion of the term of this patent subsequent to Dec. 7, 1999 has been disclaimed.

[21] Appl. No.: 383,730

[22] Filed: Jun. 1, 1982

Related U.S. Application Data

[63] Continuation of Ser. No. 210,020, Apr. 10, 1980, Pat. No. 4,362,340, which is a continuation of Ser. No. 895,024, Apr. 10, 1978, abandoned.

[30] Foreign Application Priority Data

Apr. 15, 1977 [NL] Netherlands ......................... 7704127
Apr. 15, 1977 [NL] Netherlands ......................... 7704128

[51] Int. Cl.³ ............................................. B62D 55/24
[52] U.S. Cl. ................................ 305/35 EB; 254/423; 305/36; 180/9.26
[58] Field of Search .............. 254/86 H, 423; 180/9.2, 180/9.42, 9.26; 305/10, 31, 32, 35 EB, 36, 54, 56, 57, 37

[56] References Cited

U.S. PATENT DOCUMENTS

| | | | |
|---|---|---|---|
| 1,639,536 | 8/1927 | Saives | 305/35 EB |
| 2,402,042 | 6/1946 | Haushalter | 305/37 |
| 2,571,067 | 10/1951 | Seckendorf | 254/86 H X |
| 3,511,327 | 5/1970 | Schlor | 305/10 X |
| 3,844,582 | 10/1974 | Cook | 254/86 H X |

FOREIGN PATENT DOCUMENTS

| | | | |
|---|---|---|---|
| 2509704 | 9/1976 | Fed. Rep. of Germany | 254/86 H |
| 1216756 | 4/1960 | France | |
| 7605810 | 11/1977 | Netherlands | 305/35 EB |
| 278779 | 10/1927 | United Kingdom | 305/35 EB |
| 1093802 | 12/1967 | United Kingdom | 305/10 |

Primary Examiner—David A. Scherbel
Attorney, Agent, or Firm—Penrose Lucas Albright

[57] ABSTRACT

A standard model truck or trailer, having a rear load bearing axle with dual pneumatic tires mounted on wheels at both ends of the axle, is provided a further set of like rear wheels with dual pneumatic tires which are connected to the vehicle's main frame by depending carriers pivoted thereto. These rear wheels are rearwardly biased by a compression spring and may be selectively moved forwardly or rearwardly in an arc about their pivotable connection by a hydraulic piston and cylinder arrangement. An endless tread-type track is adapted to be mounted around the succeeding pairs of dual tires on either side. Each track has two or more parts dovetailed together at the ends, held by a spring steel rod inserted in openings therethrough, each opening being defined by a polygonal tube which receives the rod so it cannot rotate. The rod is held in the tube by a detent member. A broad slightly curved plate, rectangular in plan, pivoted from supports depending from the frame forward of at least the rearmost wheels, extends rearwardly centrally between the wheels to where a hydraulic cylinder and piston assembly connects it to the frame to lift the wheels simultaneously for installing the tracks. They are installed by decreasing the distance between the wheels through the hydraulic arrangement and, when in place, by releasing pressure in the connected hydraulic piston and cylinder assembly whereby the compression spring tensions the wheels against them.

29 Claims, 9 Drawing Figures

TRACKED VEHICLES

This is a continuing application of U.S. Pat. No. 4,362,340 of Dec. 7, 1982, which issued from application Ser. No. 210,020 filed Apr. 10, 1980, which is a continuation of Ser. No. 895,024, filed Apr. 10, 1978, now abandoned.

SUMMARY OF THE INVENTION

The invention relates to vehicles, such as for example, tractors, trucks, cars, vehicular soil cultivating machines or the like, of the kind which include at least one endless trend type track arranged around wheels of the vehicle.

An object of the invention is to provide an endless tread type track that can readily be arranged on, or removed from, a vehicle, its rate of wear being low and its lifetime being long.

According to one aspect of the invention the track consists at least partly of flexible material and has at least one joint by which end parts of the track are substantially rigidly interconnected at the joint, the track being provided with extensions positioned to come into into contact with the ground during operation of the vehicle.

For a better understanding of the invention, and to show how the same may be carried into effect, reference will be made, by way of example, to the accompanying drawings, in which:

DESCRIPTION OF THE PREFERRED EMBODIMENTS

The motor-truck shown in FIGS. 1 to 5 is a mass-produced truck (hereinafter termed standard truck). In the factory this truck is provided with a frame 1 supported by steerable front wheels 2 and driven rear wheels 3, while at each side of the frame 1, two of the wheels 3 are arranged on a rear axle of the truck. At the front of the frame 1 a driver cabin 4 and a driving engine located inside the cabin 4 are provided. By means of an auxiliary shaft 5 and a differential 6 the rear wheels 3 on the rear axle are driven in known manner by the engine. The frame 1 comprises, as usual, two parallel frame beams 7 arranged symmetrically to a longitudinally extending vertical plane of substantial symmetry of the truck, said beams 7 extending, as required, over the substantially whole length of the truck. The frame beams 7 are interconnected at their rear ends by a transverse beam 8 (FIGS. 2 and 3) rigidly secured to the former. A similar transverse beam is also secured to the front ends of the frame beams 7.

Figure 4:
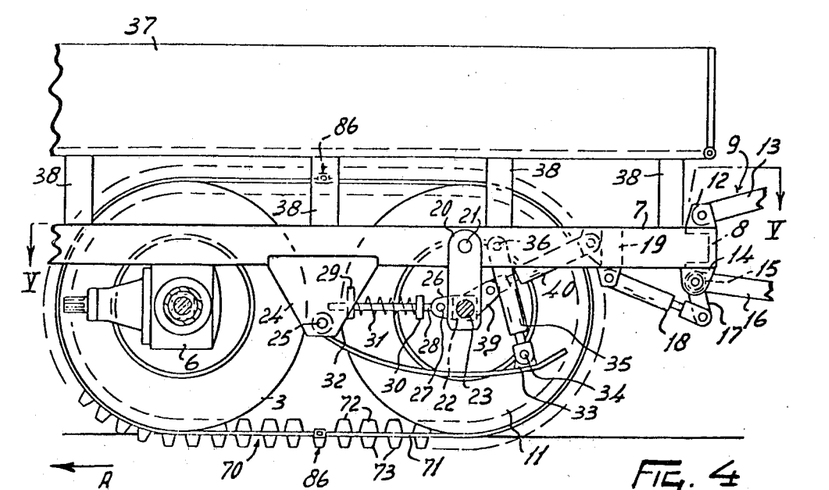
FIG. 4 is a side elevation, to an enlarged scale, of part of the truck shown in FIGS. 1 to 3 as seen in the direction of an arrow IV in FIG. 2, the wheels located at one side of the track being omitted.
Figure 5:
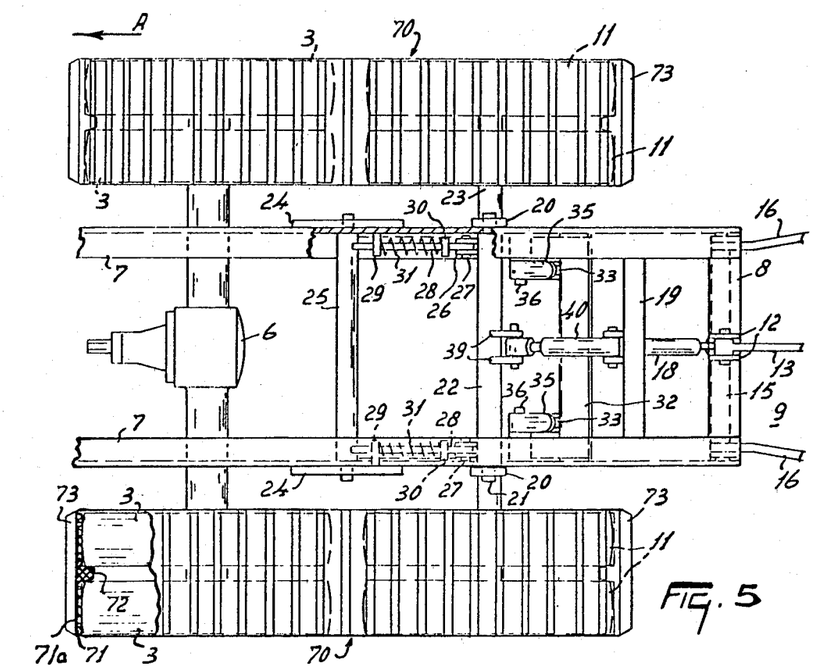
FIG. 5 is a partially broken sectional plan view taken on the line V—V in FIG. 4.

In order to adapt this comparatively inexpensive mass-produced truck to agricultural purposes, the standard truck is provided with a rear lift 9, a front lift 10 and with a non-driven second set of rear wheels 11. For this purpose a pair of ears 12 are welded to the top of the transverse beam 8 (FIG. 4), said ears holding a pivotal shaft about which a top arm 13 of the lift 9 is freely pivotable. Near the rear end of each of the frame beams 7, a pair of ears 14 are welded to the bottom of said beams, in which ears 14 a pipe 15, covering the whole width of the frame 1, is pivotally journalled. Near each of the ends of the pipe 15 is welded a lower lifting arm 16 of the lift 9. Midway along the length of the pipe 15, a downwardly extending arm 17 is rigidly secured to said pipe 15, the end of the arm 17 remote from the pipe 15 carrying a pivotal shaft to which is pivoted the piston rod of a hydraulic cylinder 18. The hydraulic cylinder 18 itself is pivoted to a transverse beam 19 arranged in front of the transverse beam 8, considered in the intended direction of forward travel A of the truck. The hydraulic cylinder 18 is inclined, in a central position, from the transverse beam 19 in a downward and rearward direction towards the arm 17 (FIGS. 4 and 5).

In order to fasten the additional sets of rear wheels 11, located behind the rear wheels 3, each of the two frame beams 7 is provided with a carrier 20 (FIGS. 4 and 5), which is pivoted to the frame beam 7 concerned by means of a horizontal pivotal shaft 21 extending transversely of the direction of travel A. Each carrier 20 extends downwards from the beam 7. The end of each carrier 20 remote from the pivotal shaft 21 is provided with a clamping piece 22. A shaft 23 is passed through the two clamping pieces 22 and through holes provided in the carriers 20 and extends beyond the outside of the carrier 20. The shaft 23 is rigidly secured to the carriers 20 by the clamping pieces 22. Near each of the two ends of the shaft 23, the pair of additional rear wheels 11 is secured so that each of these rear wheels is in line with and behind a corresponding rear wheel 3, considered in the direction of forward travel A.

At an area located, in side elevation, between the differential 6 and the carrier 20, the bottom of each frame beam 7 has welded to it a downwardly extending, generally triangular plate-shaped carrier 24. The lower ends of the two carriers 24 hold a pivotable pipe 25 extending horizontally perpendicular to the direction of travel A.

Each of the two clamping pieces 22 secured to the carriers 20 is provided with a pair of forwardly protruding ears 26 holding a pivotal shaft 27, about which the rear end of a rod 28 is pivotable. Each rod 28 extends to the front from the associated ears and is provided at a given distance from its foremost end with a plate 29 extending perpendicularly to the rod 28 and being welded to the inner side of the neighboring carrier 24. Each plate 29 has a hole for receiving associated rod 28 so that the rod 28 can slide through the plate 29. Near the ears 26, each rod 28 is provided with a plate 30 also extending perpendicular to the rod 28, which rod is also passed through a hole in the plate 30. However, the rod 28 is immovably secured in place with respect to the plate 30. The rod 28 is surrounded by a helical compression spring 31, the ends of which engage the plates 29 and 30. The free end of each rod 28 is provided with a stop (not shown), which prevents the rod 28 from slipping out of the plate 29.

The pipe 25, which is pivotable with respect to the carriers 24, has welded to it over its whole length one edge of a rigid pressure plate 32 extending rearwardly from the pipe 25 and, in the position shown in FIG. 4, slightly downward, considered in the direction of forward travel A. In the elevation of FIG. 4, the rear edge of the pressure plate 32 has a rim which is bent slightly upwards with respect to the front part joining the pipe 25. Near the front of said rear rim, ears 33 are secured to the top of the pressure plate 32 near each of its two side edges for holding a horizontal pivotal shaft 34 extending perpendicular to the direction A and having pivoted to it the end of the piston rod of a hydraulic cylinder 35. Each of the two cylinders 35 is pivoted, near its end remote from the pivotal shaft 34, to a pivotal shaft 36 which also extends horizontally perpendicular to the direction A and which is supported by the neighboring frame beam 7. Viewed in plan, the pressure plate 32 has a rectangular periphery, the width of which, measured perpendicular to the direction A, is approximately equal to the distance between the outer sides of the frame beams 7, whereas the length of the pressure plate 32, measured from the pivotal shaft 25 to its rear edge, is approximately equal to the diameter of one of the rear wheels 3 or 11. In the elevational view of FIG. 4, the pivotal axis of the pipe 25 is located approximately at the level of the foremost point of the non-drivable rear wheels 11, whereas the rear edge of the pressure plate 32 is located at the hindmost point thereof.

The truck may furthermore be provided with a loading platform 37, which may be disposed, if desired, on the frame 1 by means of supports 38 so that the bottom of the loading platform 37 is located at a distance above the tops of the frame beams 7. The loading platform 37, or a loading trough, is preferably releasably fastened to the frame 1.

Each of the two clamping pieces 22 is provided with rearwardly and upwardly inclined ears 39 holding a horizontal, transverse pivotal shaft about which the piston rod of a hydraulic cylinder 40 is arranged to pivot. The cylinder 40 itself is turnably connected to the transverse beam 19, located behind the pivotal shaft 21, by means of a pivotal shaft extending parallel to the former.

The truck is provided in known manner with an oil or other fluid pressure medium pump (not shown), which can be driven by the engine of the truck and with a hydraulic system communicating with the aforesaid hydraulic cylinders or arms. The hydraulic system can be controlled from the driver cabin 4.

The invention may furthermore be applied to mass-produced wagons (FIGS. 6 and 7) for example, towed trailers or lorries. The wagon comprises a frame 41 having two parallel, relatively spaced frame beams 42 extending in the direction A and being interconnected at the front and rear ends by transverse beams. At the front, the frame beams 42 are provided with a drawbar 43 for attaching the wagon to a truck or to a tractor. The wagon comprises an axle 44 having on each side of the frame 41 two ground wheels 45. The wagon may be provided with a loading platform 46, which can be releasably connected by means of supports 47 to the top of the frame 41. By means of carriers 48 extending downwards from the frame 41 and being pivoted to said frame 41 by horizontal pivotal shafts 49 extending perpendicular to the direction A, an additional axle 50 is arranged behind the axle 44 and parallel to the latter. The two carriers 48 again have forwardly extending ears 51 provided with rods 53 arranged to pivot about shafts 52 extending perpendicular of the direction A, said rods 53 extending forwardly from the carriers 48. The rods 53 are each provided with plates 54 each embracing the associated rod and being rigidly secured thereto, and with plates 55 located at a distance in front of the plates 54 and being secured to carriers supporting the axle 44, the plates 55 being installed in the factory. The rods 53 are slidable through holes in the plates 55. The portion of each rod 53 which is located between the plates 54 and 55 is surrounded by a helical compression spring 56 which engages the plates 54 and 55. The free end of each rod 53 is provided with a stop (not shown) which prevents the rod 53 from slipping out of the plate 55.

The additional axle 50 has, at each side of the frame, two tired wheels 57 disposed so that, considered in the direction A, one wheel of each set of two wheels 57 at one side of the frame is in line behind a wheel of the pair of ground wheels 45 located at the same side. The smallest distance between the wheels 45 and 57 is about ten centimeters (four inches) and the overall diameter of each of the wheels 45 and 57 is about one meter (39½ inches).

Each of the carriers 48 is provided at its rear with ears 58 holding a horizontal pivotal shaft 59 extending perpendicular to the direction of movement A and having pivoted to it, on each side of the frame 41, the piston rod of a corresponding hydraulic cylinder 60. The hydraulic cylinders 60 themselves are pivoted to the bottoms of the frame beams 42 by pivotal shafts 61 extending parallel to the pivotal shafts 59. The hydraulic cylinders 60 are inclined rearwardly and upwardly from the associated ears 58.

At an area located in front of the standard ground wheels 45, supports 62 are provided on the bottom of the two frame beams 42, said supports 62 being provided near their bottoms with bearings in which a horizontal pipe 63 extending perpendicular to the direction A is arranged to pivot. The pipe 63 covers the whole width between the frame beams 42. The pipe 63 has rigidly secured to it a pressure plate 64 extending, in the position shown in FIG. 7, from the pipe 63 to the rear and in a slightly inclined position beneath the axle 44. The plate 64 has a slightly bent up rear edge. The pressure plate 64, like the pressure plate 32, may be provided with profiles extending in, or transversely of the direction A for reinforcing the plate in a direction at right angles to its plane. Viewed in plan, the plate 64 has a rectangular shape like the plate 32. The front edge of the plate 64 is located in front of the standard wheels 45 whereas the rear edge of the plate, in the position thereof shown in FIG. 7 and in the side elevation of that Figure, lies midway between the front point of the wheels 57 and the axle 50. Near each of the two longitudinal edges of the plate 64, it is provided with ears 65 located at a distance behind the pipe 63 and near the front of said rear edge. The ears 65 hold a horizontal pivotal shafts 66 extending perpendicular to the direction A and having pivoted to them the piston rods of corresponding hydraulic cylinders 67. Each of the cylinders 67 itself is pivoted at its end remote from the pivotal shaft 66 to a corresponding one of the frame beams 42 by a pivotal shaft 68 that is parallel to the pivotal shafts 66. Viewed in plan, the pivotal shafts 68 are located midway between the ground wheels 45 and 57. The wagon comprises a plurality of hydraulic connections 69 (FIG. 6), by which the cylinders 60 and 67 can be coupled with the hydraulic system of the tractor or other vehicular prime mover. These cylinders 60 and 67 can thus be actuated from the driver seat of the prime mover.

Figure 8:
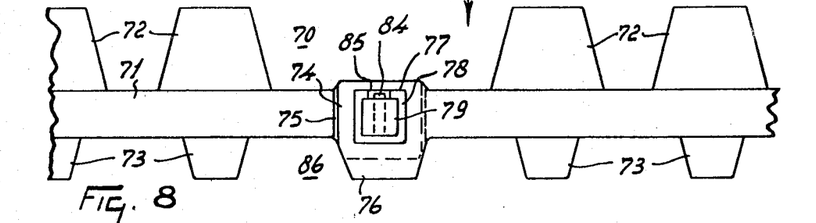
FIG. 8 is a side elevation of part of an endless track or crawler according to the invention employed on the vehicles shown in FIGS. 1 to 7.

In order to adapt the truck of the first embodiment and the wagon of the second embodiment to agricultural purposes and particularly to travel with heavy loads on weak soil, the pairs of tires wheels 3 and 11 (in the first embodiment) and the pairs of tires wheels 45 and 57 (in the second embodiment), said pairs being provided on both sides of the vehicle concerned, can be provided with an endless tread type track 70 (FIGS. 8 and 9) of flexible material, for example, synthetic resin or rubber-like material, if desired, provided with one or more nylon or canvas liners. The term "flexible type track" is to be understood to mean an endless tread type track or a crawler whose material is flexible and which does not include relatively pivotable parts.

The caterpillar tracks arranged around said sets of wheels each comprise, in this embodiment, two halves interconnected so as not to be pivotable in a horizontal sense. The caterpillar tracks may, of course, be composed in an analogous manner of more than two parts, but alternatively of a single part, the two ends of which latter can be fastened to one another.

Figure 9:
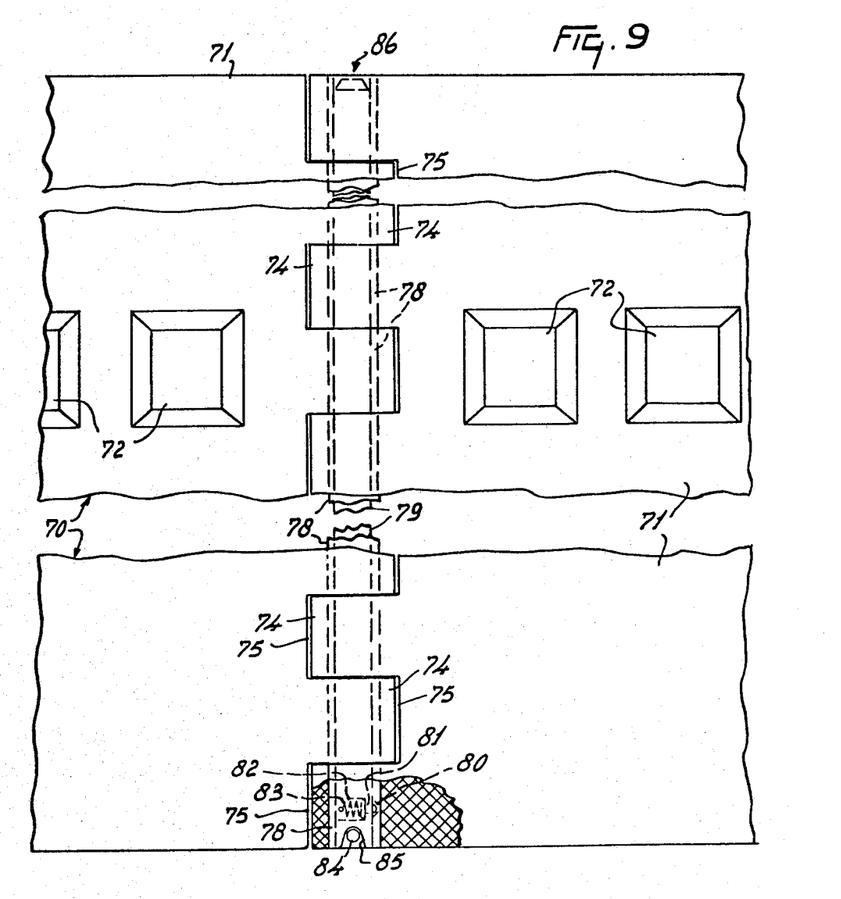
FIG. 9 is a plan view as seen in the direction of an arrow IX in FIG. 8.

The or each track part comprises an elongated belt 71 of the aforesaid material having a thickness of at least ten millimeters (4/10 of an inch), preferably about twenty-five millimeters (one inch), while the width measured in the installed state parallel to the wheel axles matches the overall width of the tyres of the two neighboring wheels 3, 11, 45, 57. This width of the belt 71 amounts to about five hundred millimeters (19 7/10 inches). Each belt 71 is provided on the inner side (the side facing the wheel axles in the installed state) with a large number of teeth or cams 72 arranged in the center of the width of the belt in a row extending in the direction of length of the belt 71. Each of the cams 72 has the shape of a truncated pyramid, the larger end surface of which is located on the inner boundary surface of the belt 71. The dimensions of the cams 72, as shown in the elevational view of FIG. 9, are adapted to the shapes of the sides of the tires of the wheels surrounded by the tracks 70 and they are chosen so that the cams 72 are held with a clamping fit between two neighboring tires. Viewed in the direction of length of the belt 71, the cams 72 are spaced apart by a distance of about one hundred millimeters (4 inches). On the outer side of the belt 71 (the side contacting the ground in the installed state) transverse ribs 73 cover the whole width of the belt 71; as seen in side elevation (FIG. 8) they have a trapezoidal shape. The transverse ribs 73 are spaced apart by a distance of about one hundred millimeters (4 inches). The pitches of the transverse ribs 73 and the cams 72 are equal to one another. The belt 71, the cams 72 and the transverse ribs 73 are integral with one another. Optionally, a liner 71a of nylon, canvas or the like may be included in the inner surface of belt 71.

Near the two ends of each of the endless tread track parts, the belt 71 is provided, viewed in plan, with a rim which is milled so that the two ends of track 70, or of two track parts, inter-engage as is shown in FIG. 9. The milled end rims of the two parts are formed by, viewed in plan, alternating rectangular extensions 74 and cavities 75. Viewed in side elevation, each extension 74 forms a thickened part of the belt 71 (FIG. 8) and has on the outer side also parts of a transverse rib 76. Each extension 74 has a square hole 77 in the flexible material, which hole extends at right angles to the direction of length of the belt 71 and passes right through the extension 74 so that, when the extensions 74 and the cavities 75 of two joined belt parts inter-engage, the registering holes 77 form substantially uninterrupted channel extending throughout the width of the belt parts. In each hole 77 is fastened a separate length of tubing 78 by vulcanization or casting of the material to cover the whole width of the extension 74 concerned. Each tubing 78 has, in this embodiment, a square cross-section and the outer surfaces of the tubing are in contact with the inner surfaces of the hole 77 concerned. When the extensions 74 and the cavities 75 are intermeshing in the manner shown in FIG. 9, the tubings 78 form a substantially uninterrupted channel. Through the tubings 78 is passed a spring steel rod 79, the length of which is equal to the width of the belt parts 71. The rod 79 is solid and has boundary surfaces which closely fit the inner surfaces of the hollow tubings 78. The rod 79 is thus closely surrounded by the tubings 78 which, in turn, are rigidly secured to the belt parts 71a. non-pivotable joint is thus provided between the belt parts 71. The tubings 78 and the co-operating rod 79 may have a different cross-section, for example, they may be rectangular or hexagonal.

In one of the walls of one of the tubings 78, preferably the tubing in an extension 74 that is located on one side of a belt part 71, a cavity 80 is provided on the inner side of the tubing for receiving, in the installed state, a locking pin 81 provided in the rod 79. For this purpose the rod 79 has a cylindrical cavity 82 holding a spring 83, which urges the locking pin 81 outwardly through a bore communicating with the cavity 82 so that the tip of the locking pin can emerge from the rod 79. The center lines of the locking pin 81, the cavity 82 and the spring 83 are at right angles to the direction of length of the rod 79. Near the end thereof adjacent to the locking pin 81, the rod 79 is provided with a rigidly secured pin 84 which projects from one side of the rod. The longitudinal axis of the pin 84 is at right angles to that of the locking pin 81. In the corresponding tubing 78, one of the walls has a V-shaped notch 85 starting from the end face of the tubing 78 located on the outer surface of the belt parts 71. In the installed state, the end of the pin 84 snaps into the notch 85 of the tubing 78. The parts 78, 79 constitute a joint 86 between two endless tread track parts. Track 70 in this embodiment comprises two parts interconnected in a non-pivotable, substantially rigid manner by two joints 86 but, as an alternative, track 70 may be formed by a single part the ends of which are interconnected by a single joint 86 and, as a further alternative, the track 70 may be formed by more than two parts which may be interconnected by more than two joints 86.

It should be noted that the track 70 of FIGS. 1 to 7 is shown surrounding the vehicle ground wheels so that these Figures illustrate the track 70 in its operative position, but the vehicles shown may, of course, also be employed without the tracks 70.

An endless tread track according to the invention may, of course, also be employed in vehicles other than those mentioned above, which are equipped in the factory with pairs of tires wheels on each side of the vehicle, for example, motor cars, tractors or soil cultivating machines, the latter being equipped, for example, with grippers or cranes. In order to arrange an endless tread type track on such vehicles and also on those shown in FIGS. 1 to 7, the hydraulic cylinders 35 (FIGS. 1 to 5) and 67 (FIGS. 6 and 7) are energized from the driver seat so that the pressure plate 32 or 64 turns about the center line of the pipe 25 or 63 down to the ground. When the pressure plate 32 or 64 is pressed hard against the ground by means of the cylinders 35 or 67 so that part of the weight of the vehicle is evenly distributed across the comparatively large surface of the pressure plate, the rear part of the vehicle can be lifted from the ground.

The two parts of each caterpillar track 70 will have been previously connected by means of one joint 86. For this purpose the extensions 74 and the cavities 75 at the area of the joint 86 of the endless tread track parts are fitted to one another so that the tubings 78 form a single substantially uninterrupted hole through which the rod 79 is passed so that the caterpillar track parts become interconnected, The rod 79 is inserted in a given position into the tubings 78 so that the locking pin 81 projecting from the rod 79 slides along the inner wall of the tubing 78 where the cavity 80 is provided. When the pin 84 of the rod 79 snaps into the notch 85, the locking pin 81 just snaps into the cavity 80. Since the pin 84 projects from only one side of the rod 79 and the notch 85 is provided in only one wall of the tubing 78, the locking pin 81 will snap with certainly into the cavity 80 when the pin 84 engages the notch 85. In this way, the rod 79 is prevented from moving in an axial direction with respect to the two track parts during operation.

The two endless track parts, having each a length of about 250 centimeters (98½ inches) and being intercoupled so far by only one joint 86 are put on the ground beneath the sets of raised wheels 3, 11 or 45, 57 so that at least a number of the row of teeth or cams 72 are located beneath the gap between two tires located side by side. This disposition of tracks 70 beneath the sets of consecutive wheels is, of course, performed on both sides of the vehicle.

Subsequently, the hydraulic cylinders 35 or 67 are actuated so that the pressure plates 32 or 64 are moved upwardly into the positions shown in the Figures. The wheels 3, 11 or 45 and 57 are lowered onto tracks 70 lying on the ground, while a number of the cams 72 penetrate in between two neighboring tires. The further parts of tracks 70 are then passed manually upwardly around the sets of wheels, the free ends being approached as closely as possible to one another. In the meantime, or beforehand, the hydraulic cylinders 40 or 60 are actuated so that the wheel axle 23 or 50 is moved towards the axle of the wheels 3 or 44 lying in front thereof. The rods 28 or 53 therefor slide forwardly through the plates 29 or 55 and the already compressed springs 31 or 56 are further compressed. Since the wheel sets 11 or 57 are nearer the wheel sets 3 or 45, the second joint 86 can be readily established manually because track 70, in this position, has an excess of length. The second joint 86 is established in exactly the same manner as the first joint 86.

Figure 7:
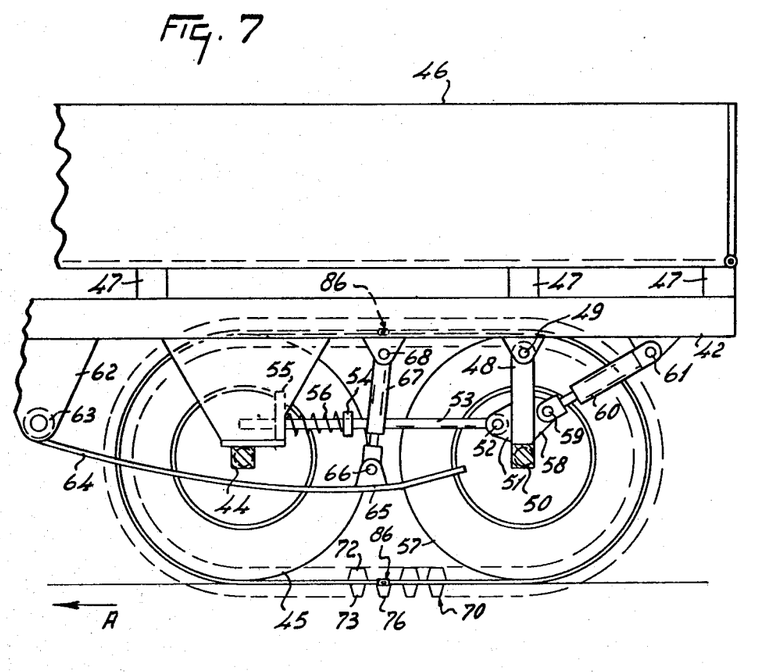
FIG. 7 is a side elevation, to an enlarged scale, of part of the wagon of FIG. 6, the wheels located one side of the wagon being omitted.

Subsequently, the hydraulic fluid pressure in the cylinders 40 or 60 is eliminated so that the springs 31 or 56 urge the arms 20 or 48, and hence the wheel sets 11 or 57, back into the positions shown in FIGS. 4 and 7 so that track 70 is tensioned in the desired manner and is settled correctly with respect to the sets of wheels. During operation, tracks 70 are constantly kept taut by the springs 31 or 56.

Figure 1:
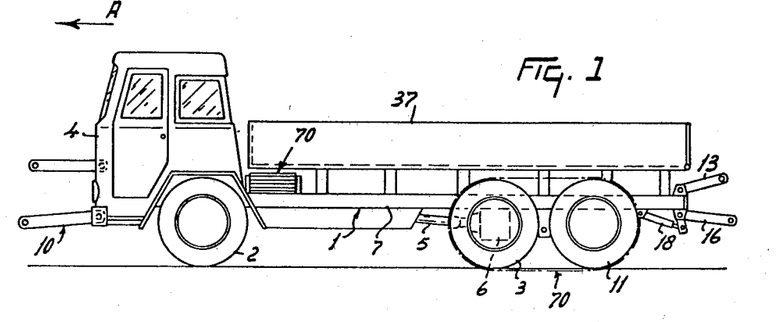
FIG. 1 is a side elevation of a motor-truck to which the invention is applied.
Figure 2:
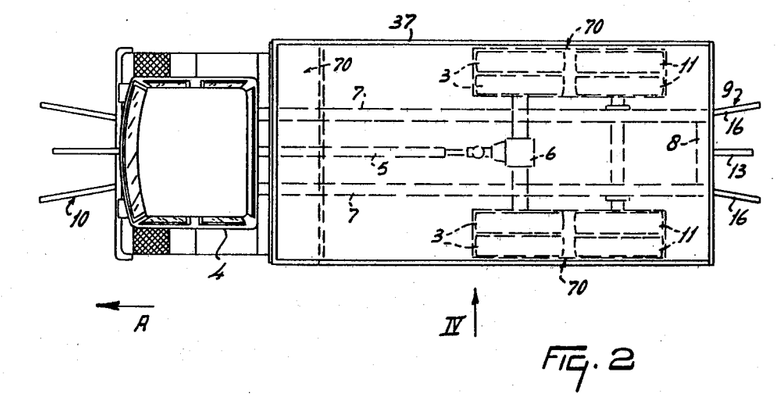
FIG. 2 is a plan view of the motor-truck shown in FIG. 1.
Figure 3:
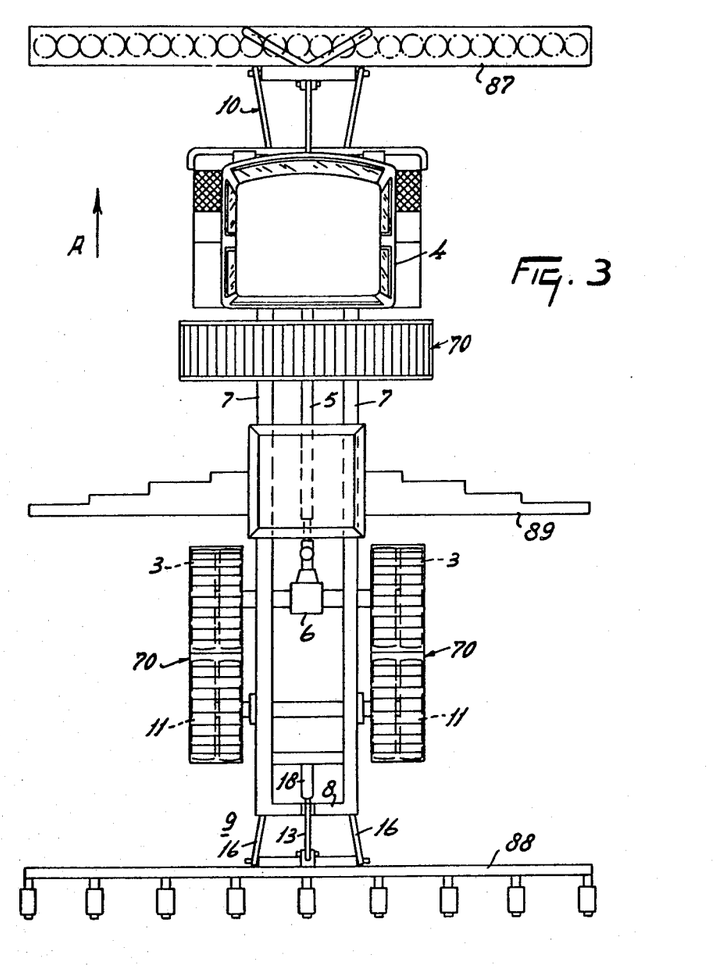
FIG. 3 is a plan view of the truck of FIGS. 1 and 2 employed for agricultural purposes.
Figure 6:
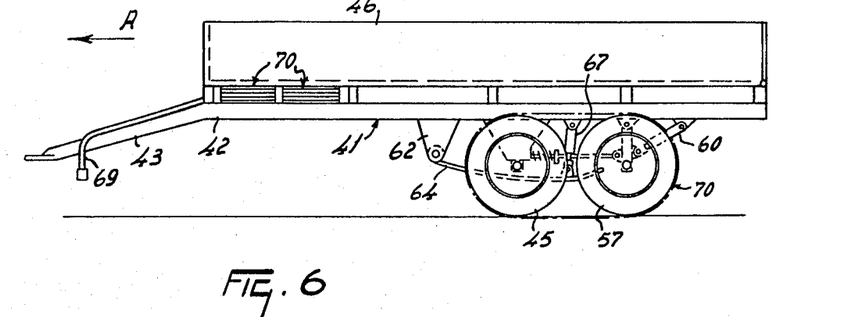
FIG. 6 is a side elevation of a towable wagon to which the invention is applied.

If tracks 70 are not employed, they can be stored in a folded state at a place between two of the supports 38 or 47 as is illustrated in FIGS. 1, 3 and 6, the folded tracks 70 then extending transversely of the direction of movement A and bearing on the frame beams 7 or 42. When the vehicle runs directly on the tires of the wheels 3, 11 or 45, 57, the aforesaid stops on the free ends of the rods 28 or 53 come into contact with the plates 29 or 55 so that the springs 31 or 56 cannot urge the rods out of the holes in said plates. The additional wheels 11 or 57 are then connected with the frame so as to be bodily pivotable against resilient opposition.

It will be obvious tracks 70 according to the invention may also be arranged on wheels of dissimilar diameters.

The flexible tread type tracks of the contruction described above can always be applied or removed easily owing to their low weight. Owing to the combination of the flexible caterpillar tracks with tires, a vehicle equipped with such tracks may be used on roads without causing damage thereto. Track 70 according to the invention may also be employed as members to replace snow and other non-skid chains.

Owing to the provision of the caterpillar tracks, the driven wheels have a high tractive force as a result of the large ground contact surface end of the large number of transverse ribs 73 while, at the same time the ground contact pressure is reduced to a low value so that the risk of sinkage of the vehicle is very slight.

Since the flexible type endless tread tracks are free of hinges, the wear is very slight, whereas the lifetime is long. If desired, tires normally having a low rolling resistance on the road or on solid soil may be employed. In conjunction with tracks 70 the rolling resistance on weak soil is also slight.

Since standard trucks are mass-produced in large numbers and their cost of manufacture is, therefore, comparatively low, it is economically satisfactory to equip them with readily removable and storable tracks 70 according to the invention, since the field of use can thus be extended to agriculture. The truck shown in FIG. 3 may be equipped by means of the foremost lift 10 with, for example, a rotary harrow 87 and by means of the hindmost lift 9 with for example seed drill 88. If desired, when the loading trough 37 is removed, another tool, for example, a fertilizer distributor 80 may be mounted on the tops of the frame beams 7, which may be provided with coupling means about midway along the length of the vehicle.

The invention is not necessarily limited to the statements made in the foregoing description /or in the following claims or both, but also may be directed to details of the Figures whether described or not described.

I claim:

1. In combination with an agricultural vehicle having a pair of rear wheels with pneumatic tires thereon in tandem on each side thereof which are adapted to receive a removable endless track which connects each said pair of wheels whereby it extends around said pair of tires and moves therewith, at least one of said wheels of each said pair mounted on an axle, the axis of which is retained substantially at a fixed distance under said frame when said track is installed, each said track having a readily connectible and disconnectible connection between opposite ends, lifting means centered between said pairs of wheels as seen from the rear and comprising pivot means mounted on each side of the frame of said vehicle forward of at least one of said tires in each said pair of wheels, a pressure plate for bearing the weight of the rear part of the vehicle, the forward and greater part of which is slightly curved as seen from the side, pivotally connected to both said pivot means at its forward end, said pressure plate having a width substantially equal to the width between the outer sides of said vehicle frame and being so constructed and arranged that the rear part of the weight of the vehicle is distributed substantially continuously transversely across a comparatively large surface of said pressure plate and said wheels on each side thereof are lifted substantially an equal distance relative to said pressure plate and the underlying ground when the rear part of the vehicle is supported thereby, selectively powered extensible means pivotally interconnecting said pressure plate near its rear end to said frame, said extensible means adapted to cause said pressure plate to be pressed against the ground between said wheels and simultaneously lift said wheels so that said tires mounted thereon are simultaneously raised a substantially equal distance above the ground and said tracks can be rapidly installed or removed.

2. A vehicle according to claim 1, wherein said pivot means is connected forward of both pairs of said tires.

3. A vehicle according to claim 1, wherein said pivot means extends transversely completely across the vehicle's frame and is connected to the lower side thereof.

4. A vehicle according to claim 3, wherein said pressure plate comprises a unitary integral plate.

5. A vehicle according to claim 4, wherein said plate comprises an upwardly bent portion adjacent its rearward edge relative to the remainder of said plate.

6. A vehicle according to claim 5, wherein said extensible means is connected to said pressure plate at its slightly curved part immediately forward of said bent portion.

7. A vehicle according to claim 5, wherein said extensible means comprise two transversely spaced apart parts, each said part being connected to said pressure plate near a lateral edge thereof.

8. A vehicle according to claim 7, wherein said pressure plate is rectangular as seen in plan.

9. A vehicle according to claim 1, wherein said vehicle is a truck having further forward wheels, said pressure plate adapted to be pressed against the ground laterally between and adjacent the rearmost of said wheels.

10. A vehicle according to claim 1, wherein said vehicle is a wagon, said wheels comprising the only wheels for supporting said wagon when not connected to a further vehicle, said pressure plate adapted to be pressed against the ground laterally between the adjacent said wheels and forward of the rearmost of said wheels.

11. A vehicle according to claim 10, wherein said pressure plate is adapted to be pressed against the ground to the rear of the axis of rotation of the foremost of said wheels.

12. A vehicle according to claim 1, wherein said pivot means is connected to the rear of the foremost of said tires.

13. A vehicle according to claim 1, wherein said extensible means comprises at least one hydraulic piston and cylinder assembly.

14. A vehicle according to claim 13, wherein there are two said hydraulic piston and cylinder assemblies.

15. A vehicle according to claim 14, wherein said hydraulic piston and cylinder assemblies are spaced apart laterally and are connected near lateral edges of said pressure plate and said vehicle frame.

16. A vehicle according to claim 15, wherein said hydraulic piston and cylinder assemblies are connected by pivot members to said vehicle's frame and to said pressure plate.

17. A vehicle according to claim 1, wherein each said track comprises at least two connectable portions having a length which is substantially the same as the widest width of said vehicle whereby said track portions are stored in a transverse position on said vehicle when not in use.

18. A vehicle according to claim 1, wherein only one wheel on either side of said vehicle is driven by the power plant of said vehicle.

19. A vehicle according to claim 18, wherein said driven wheels are the foremost of said wheels.

20. A vehicle in accordance with claim 1 which comprises a lifting device for agricultural implements at its rear.

21. A vehicle in accordance with claim 1 wherein said endless track is provided with transverse ground engaging ribs, the width of said pressure plate being about twice the width of said ribs measured transverse to the vehicle's usual direction of forward travel.

22. A vehicle of a type included in the group which comprises tractors, motorcars, soil cultivating machines, trucks, wagons and the like, said vehicle having on each side a set of at least two rear ground wheels which each include at least one pneumatic tire and are disposed in tandem whereby tires on each side are located one behind the other, an engine operatively connected to drive at least two of said ground wheels, tracks for selective arrangement around each set of said ground wheels disposed in tandem, each said track comprising a readily connectible and disconnectible connection between opposite ends which when so connected comprises an endless tread, lifting means comprising an actuable lifting device adapted to lift both said sets of ground wheels from the ground at each side of the vehicle, said lifting device being centered between said sets of ground wheels as seen from the rear, said lifting device comprises a plate having a rectangular periphery which is pivotly connected at one edge thereof to a frame included in the vehicle, said plate having a length greater than its width, said width spanning the motor portion of the transverse distance between said ground wheels and said plate having a relatively large surface adjacent an edge thereof opposite said one edge for contacting the underlying ground so that the weight of the vehicle normally supported by said ground wheels is distributed laterally across said large surface and said ground wheels on each side are elevated the same distance relative to said plate.

23. A vehicle in accordance with claim 22, comprising a pivot axis for said plate located outside the region between said sets of ground wheels.

24. A vehicle in accordance with claim 22, comprising hydraulic means whereby said lifting device is hydraulically actuated.

25. A vehicle in accordance with claim 22, wherein the vehicle is a mass produced standard truck having a driving engine, a cab and a rear axle with a differential for driving at least two said ground wheels.

26. A vehicle in accordance with claim 22, wherein said readily disconnectible connection comprises dovetailed ends with registering aligned openings which receive a rod therethrough, said rod being detachably secured in at least one of said openings by detent means.

27. A vehicle of a type included in the group which comprises tractors, motorcars, soil cultivating machines, trucks, wgons and the like, said vehicle comprising a frame, a set of at least two rear ground wheels on axles connected to said frame on each side of the vehicle, each said ground wheel including at least one pneumatic tire and said ground wheels, in each said set being disposed in tandem whereby tires on each side of the vehicle are located one behind the other, tracks for selective arrangement around each set of said ground wheels disposed in tandem, each said track comprising a readily connectible and detachable connection between opposite ends so that when said ends are connected it comprises an endless tread, the axes of said axles being retained parallel and at a substantially fixed location under said frame when said tracks are installed, lifting means comprising a lifting device which is actuable as a unit to lift both said sets of ground wheels from the ground at each side of the vehicle at the same time, a pressure plate which is adapted to contact the ground being included in said lifting device, said pressure plate pivotally connected to said frame so its rear edge is retained substantially parallel to said frame as seen from the rear, two parallel hydraulic piston and cylinder assemblies interconnecting said frame and said pressure plate to the rear of its pivotal connection to said frame, said pressure plate being located under said frame and extending from closely adjacent one set of ground wheels across the vehicle to closely adjacent the other said set of ground wheels, so that the weight of the vehicle normally supported by said ground wheels is distributed substantially continuously cross the width of said pressure plate and said ground wheels are maintained equidistant from said pressure plate when said ground wheels are lifted by said lifting device.

28. A vehicle in accordance with claim 27, wherein said pressure plate is pivotly connected to said frame included in the vehicle near one of the boundaries of said plate.

29. A vehicle in accordance with claim 28, wherein said plate is curved whereby it is concave on its upper side.

* * * * *